Figure 1:
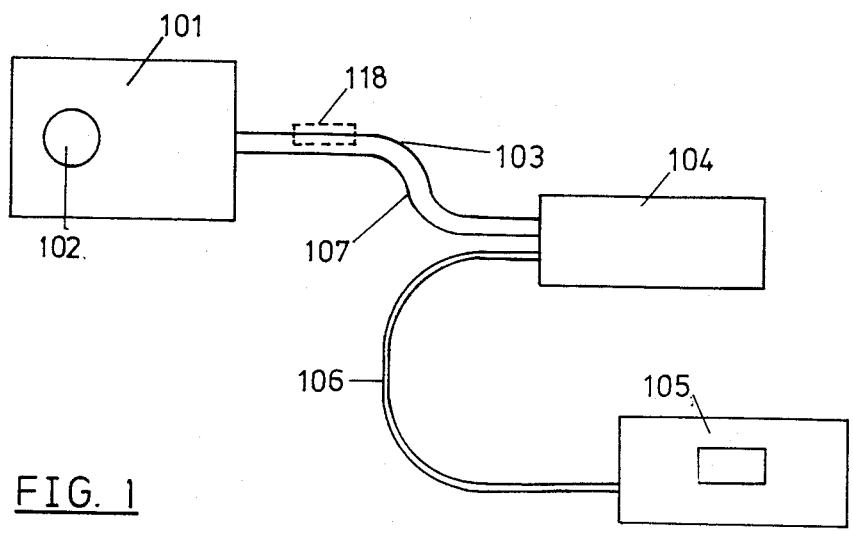

| United States Patent [19] | [11] Patent Number: 4,904,876 |
|---|---|
| Nobbs et al. | [45] Date of Patent: Feb. 27, 1990 |

[54] DETECTION OF ULTRAVIOLET RADIATION

[75] Inventors: James H. Nobbs, Leeds; Peter K. T. Oldring; David Duerden, both of Morpeth, all of United Kingdom

[73] Assignee: Thomas Swan & Co., Ltd., Co. Durham, United Kingdom

[21] Appl. No.: 188,255

[22] Filed: Apr. 29, 1988

[30] Foreign Application Priority Data

May 2, 1987 [GB] United Kingdom ............... 8710522

[51] Int. Cl.$^4$ .............................................. G01J 1/42
[52] U.S. Cl. ................................ 250/461.1; 250/372
[58] Field of Search ................. 250/461.1, 372, 365

[56] References Cited

U.S. PATENT DOCUMENTS 4,403,826  9/1983  Presby ................................ 250/372

FOREIGN PATENT DOCUMENTS 3119570  12/1982  Fed. Rep. of Germany ...... 250/372

OTHER PUBLICATIONS

Jagger, J. ". . . VV Dose-Rate Meter . . . " Rad. Research 14, (1961) pp. 394-403.

*Primary Examiner*—Janice A. Howell
*Assistant Examiner*—Richard Hanig
*Attorney, Agent, or Firm*—Bromberg & Sunstein

[57] ABSTRACT

A device for detecting ultraviolet radiation comprises a measuring head (101) to receive the ultraviolet radiation and comprising a filter (112) which emits fluorescent light in an amount dependent on the amount of ultraviolet radiation. The fluorescent light emitted is monitored to obtain a measure of the amount of ultraviolet radiation. A means (115) may be included to compensate for the temperature dependence of the filter.

10 Claims, 2 Drawing Sheets

DETECTION OF ULTRAVIOLET RADIATION

This invention relates to the detection of ultraviolet radiation.

High power ultraviolet lamps tend to deteriorate with use. Thus, it is conventional practice to replace the lamps after they have been used for a set period. However, the lamps are very expensive and in some cases, they may still be producing an adequate intensity of ultraviolet radiation after said set period. Thus replacement in such circumstances would be economically wasteful. Further, in other cases, the lamps may have deteriorated markedly before the set period has elapsed. Thus they may perhaps have been producing radiation of inadequate intensity for some time prior to replacement. There is thus a need to monitor the performance of such lamps.

It is known to use printing inks which can be cured (solidified) by exposure to ultraviolet radiation. When using inks of this type it is important that sufficient ultraviolet radiation is used to adequately cure the ink. On the other hand, it is also important not to use too much ultraviolet radiation since this can lead to degradation of the material being printed. There is thus a need to monitor the amount of ultraviolet radiation being used when printing with ultraviolet radiation-curable inks in order to obtain optimum results.

It is also frequently desirable to be able to monitor the rate at which liquid films such as inks, surface coatings, paints, lacquers, printed circuit board resists, etc, reach their solidified state when, for example, carrying out quality control tests on such materials and formulating new materials. In our copending European Patent Application No. 87307447.0, there is described a method and apparatus for monitoring the solidification characteristics of a solidifiable liquid film which involves causing relative movement between a stylus and a substrate coated with the film whilst the film is solidifying and monitoring the resistance to movement of the stylus through the film. In a particularly preferred embodiment, the film is solidified by being cured using radiation and particularly ultraviolet radiation and, in such cases, it is necessary to monitor the amount of ultraviolet radiation being used in order to be able to properly assess the solidification characteristics of different films.

It is an object of the present invention to provide a method and means of monitoring ultraviolet radiation in applications such as above described.

Generally, ultraviolet radiation sources also tend to generate heat and thus the ink or other liquid film being cured by ultraviolet radiation will also tend to be subjected to elevated temperatures. Embodiments of the present invention may therefore provide a method and means of monitoring ultraviolet radiation which is substantially independent of, or at least partially compensates for, the temperature and/or least partially compensates for, the temperature and/or the intensity of infra red and/or visible light, at the location where the monitoring is carried out.

According to the present invention there is provided a method of monitoring the amount of ultraviolet radiation present at a desired location characterised in that a filter is provided at said location of the type which emits fluorescent light when exposed to ultraviolet radiation in an amount dependent on the amount of ultraviolet radiation at said location and the fluorescent light emitted is monitored to obtain a measure of the amount of ultraviolet radiation at said location.

According to a further aspect of the present invention, there is provided a device for detecting the amount of ultraviolet radiation present at a desired location characterised in that it comprises (i) a measuring head for positioning at said location, said measuring head including a filter of the type which emits fluorescent light when exposed to ultraviolet radiation in an amount dependent on the amount of ultraviolet radiation to which it is exposed, and (ii) a means for detecting the amount of fluorescent light emitted to obtain a measure of the amount of ultraviolet radiation present at said location.

By selection of a suitable filter, it is possible to arrange that effective fluorescence does not occur when infra red and/or visible light is incident upon the filter. Furthermore, it is possible to select a filter the fluorescence of which is excited by part only of the ultraviolet spectrum.

The present invention is particularly suitable for enabling the amount of ultraviolet radiation to be monitored continuously.

In this way, the performance of ultraviolet lamps can be checked and controlled. For example, the lamps can be manually adjusted, in dependence upon the amount of radiation detected, so that the intensity of ultraviolet radiation produced is kept at a constant level. Alternatively, by using a closed loop system, the intensity can be kept constant automatically in dependence upon the amount of radiation detected. Further, by continuously monitoring the ultraviolet radiation used to cure printing inks in a printing press, any deterioration in intensity can be detected and compensated for by, for example, reducing the speed at which the material being printed is transported through the press.

The present invention makes use of the principle of fluorescence. When matter is exposed to high energy radiation, an electronic transition can occur whereby the molecules are put in an excited state. After an interval of time, the electron returns to a lower level and radiation having a frequency corresponding to the difference in energy of the initial and final electronic levels is emitted. This fluorescent radiation generally has a greater wavelength i.e. a lower energy than the radiation which initially puts the molecule into its excited state.

In accordance with one embodiment, the fluorescent light emitted by the filter is transmitted by a fibre optic cable to a photo diode which determines the intensity of the fluorescent light. The photo diode and its associated circuitry are located at an appropriate distance from the source of the ultraviolet radiation (e.g. 2 meters). This embodiment of the use of a remotely located photodiode is particularly of use where high power lamps are used as the source of ultraviolet radiation because of the heat and infra-red intensity usually generated by such lamps.

In an alternative embodiment, the photo diode may be attached directly to one side of the filter material so as to directly receive the fluorescent light emitted by the filter. This embodiment is suitable for use with ultraviolet radiation sources in the form of low power lamps.

An important option provided by the invention is the possibility of enabling an interference filter to be positioned between the fluorescent filter and the photodiode so that fluorescent light of a selected wavelength only is monitored to provide greater versatility. Similarly an interference filter may be provided between the ultraviolet radiation source and the fluorescent filter so that the fluorescent filter is subjected to exciting radiation of selected wavelength only.

Figure 2:
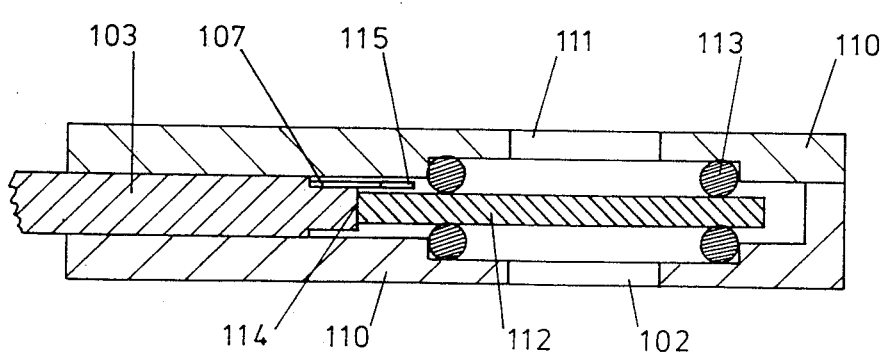
Figure 3:
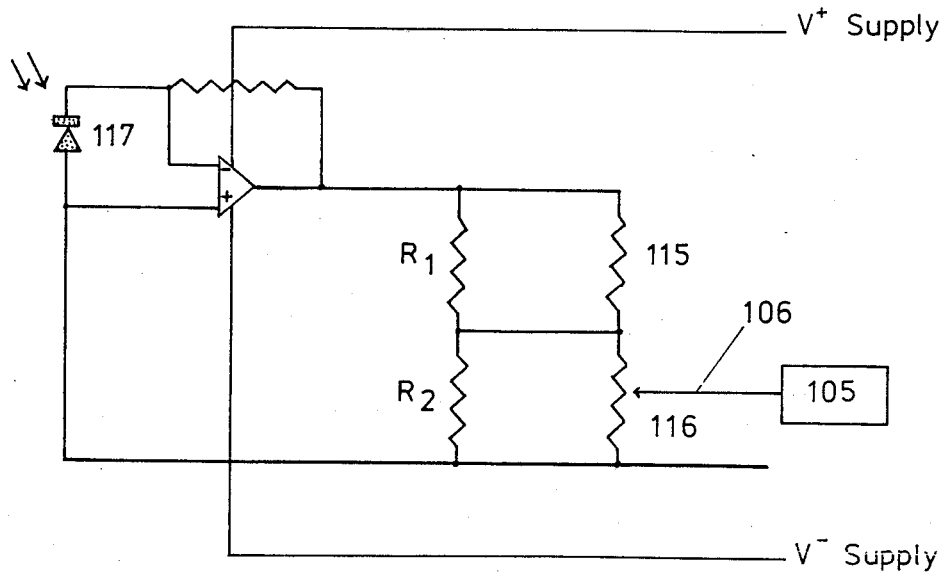
Figure 4:
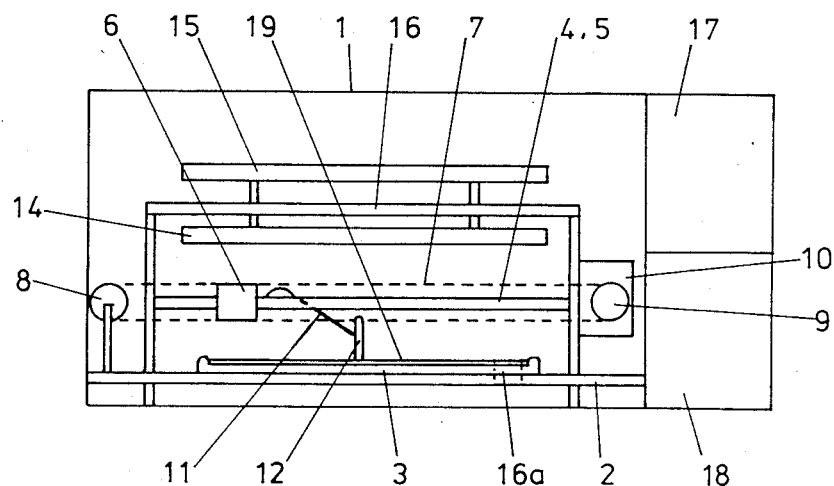

For a better understanding of the invention and to show how the same may be carried into effect, reference will now be made, by way of example, to the accompanying drawings, in which:

FIG. 1 is a schematic view of a device in accordance with the present invention, FIG. 2 is a cross-section through a part of the device of FIG. 1, FIG. 3 is the electric circuit diagram of a part of the device of FIG. 1, and FIG. 4 is an elevation of an apparatus for monitoring the solidification characteristics of a solidifiable liquid film and incorporating the device of FIGS. 1 to 3.

Referring now to FIG. 1, the device incorporates a measuring head 101 which includes an aperture 102 whereby ultraviolet radiation may enter the head and cause the desired fluorescent light to be emitted. This light is conducted by means of a fibre optic cable 103 to a photo-diode detector unit 104 which converts the fluorescent light into an electrical signal which is transmitted to a display unit and power supply 105 by electrical cable 106. The measuring head 101 also includes a thermistor which is operably connected to the photo-diode detector unit 104 by means of an electric cable 107. Optionally, an interference filter 118 may be included in the fibre optic cable 103 so that fluorescent light of a selected wavelength only is received and monitored by the photodiode 104. The interference filter 118 may be placed between the optic cable 103 and the photo-diode detector unit 104 as shown; or alternatively, an interference filter may be positioned between the aperture 102 and the source of ultraviolet radiation so that radiation of selected wavelength only reaches the measuring head 101.

The measuring head is shown in more detail in FIG. 2. The head comprises a two-part casing 110 formed of brass. The casing includes the aperture 102 in one surface to allow the ultraviolet radiation to enter the head and a corresponding aperture 111 on the opposite surface to allow the unabsorbed radiation to leave the head. Mounted across the path between apertures 102 and 111 is a filter 112 supported by opaque O-rings 113 formed of silicon rubber. These O-rings hold the filter 112 in position and yet allow the considerable thermal expansion of such filters to be accommodated.

The filter 112 is a fluorescent filter which emits fluorescent light on exposure to ultraviolet radiation in proportion to the amount of ultraviolet radiation present. Suitable filters for this purpose are long pass glass filters such as that known under the designation OG455 commercially available from Barr & Stroud Ltd.

An end 114 of the fibre optic cable 103 is adhered to an edge of the glass filter 112 which is perpendicular to the ultraviolet radiation receiving face of the filter. A transparent adhesive is used for this purpose. Also, a thermistor 115 is provided within the casing 110 and this is located adjacent to the glass filter 112 so as to be subject to the same temperature as the glass filter 112. The thermistor 115 is connected by the cable 107 to the photo-diode detector unit 104.

Referring now to FIG. 3, the photo-diode detection unit comprises a photo-diode 117 which is connected across the inputs of a pre-amplifier circuit and a temperature compensation circuit connected to the output of the pre-amplifier. In this embodiment, the photo-diode 117 and pre-amplifier are integrated together in the same package. The temperature compensation circuit is a resistor network incorporating the thermistor 115 for compensating for the temperature dependence of the fluorescence intensity. A potentiometer 116 is also incorporated and an output terminal is connected thereto for supplying a final output signal with adjustable sensitivity to the display unit 105.

In use, the measuring head 101 is positioned at the location to be monitored so that the ultraviolet radiation can enter aperture 102 and pass through the filter 112. On exposure of the filter 112 to the ultraviolet radiation, it emits an amount of fluorescent light in proportion to the amount of ultraviolet radiation present. The fluorescent light is conducted from the filter 112 to the photo-diode 117 by fibre optic cable 103 and this generates a voltage having a magnitude dependent upon the intensity of the fluorescent light. The voltage generated across the photo-diode 117 is amplified by the pre-amplifier circuit and the output signal from this pre-amplifier circuit is passed to the temperature compensation circuit. This latter circuit reduces the voltage by a factor depending upon the temperature of the thermistor 115 and the adjustment of the potentiometer 116. The component values are chosen so that the thermistor 115 compensates as nearly as possible for the temperature dependence of the intensity of the fluorescent light. Thus, for example, $R_1$ may be 20 kilo ohms, $R_2$ may be 3 kilo ohms, the thermistor 115 may be an RS Components Ltd, Type GM473 Stock No. 151-158 thermistor and the potentiometer 116 may be of 10 kilo ohms. The final output voltage is fed via the cable 106 to the display unit 105.

It will of course be appreciated that the particular values chosen for these components depend upon the particular type of fluorescent filter used to detect the ultraviolet radiation. Fluorescent filter glasses differ widely in their characteristic excitation and emission spectra. Consequently, by the appropriate choice of fluorescent filter glass, the detector unit can be made selectively responsive to regions of the ultraviolet spectrum, for example glass GG480 from Barr & Stroud is over three times more sensitive to radiation in the range 200-255 nm, than between 300-350 nm, whereas glass GG400 from Oriel Scientific is much more sensitive to light in the range 380-400 nm than light at 250-350 nm.

The selective response can be enhanced by the interposition between the fluorescent glass and the photodiode of a suitable optical filter, such as the interference filter 118, which absorbs part of the fluorescent region.

Referring now to FIG. 4, the device of FIGS. 1 to 3 is incorporated in an apparatus for monitoring the solidification characteristics of a solidifiable liquid film. The apparatus comprises a generally rectanguloid casing 1 including an internal floor 2 for supporting a movable tray 3 containing a substrate 19 carrying a wet film on its free surface. A pair of spaced parallel guide rails 4 and 5 is securely mounted within the casing 1 above the floor 2 and a carriage in the form of a cross-bar 6 is mounted on the guide rails 4 and 5 so as to be axially movable therealong. The carriage is connected to an endless wire (denoted by discontinuous line 7) passing over a freely rotating pulley 8 at one end of the casing 1 and passing over a pulley 9 driven by a motor 10 at the other end of the casing 1. Thus, on rotation of pulley 9 by motor 10, the carriage is caused to traverse from one end of the guide rails 4 and 5 to the other. The cross-bar is connected to one end of a spring 11 having its other end connected to a stylus 12. The arrangement is such that the stylus 10 penetrates the liquid film on the substrate 19 so as to contact the surface of the substrate. Strain gauges are mounted at either side of the spring 11.

The apparatus includes a pair of ultraviolet lamps 14 located above the floor 2 so as to subject the film on the substrate 19 to ultraviolet radiation. The lamps 14 are mounted on one side of a slidable partition 16 which carries a further pair lamps 15 on its other side. The film on the substrate 19 may be illuminated by either lamps 14 or 15, the choice being made by removing the partition 16 from the casing, inverting the same so that the desired lamps face the film, and replacing it in the casing. The measuring head 101 of the device of the present invention is mounted in the casing at a similar level to the substrate 19 so that the filter 112 receives the same ultraviolet radiation as does the film on the substrate 19.

In use, the carriage is positioned along the side rails 4 and 5 in such a location that the stylus 12 penetrates through the liquid film at one end of the substrate 19 so as to contact the surface of the substrate. Then, the motor 10 and lamps 14 (or 15) are actuated so as to cause the carriage to move along the guide rails 4 and 5 with the stylus 12 being pushed or pulled through the film on the substrate 19 whilst it is curing as a consequence of being irradiated by the ultraviolet lamps 14 (15). As the film cures, the stylus encounters increased resistance to motion through the film and this causes the spring 11 to be deflected. The amount of deflection is monitored by the strain gauges and the readings exhibited by the strain gauges are shown as a trace on a chart recorder. The point of cure and the rate of cure can be read off from the trace. By noting the amount of radiation received by the film (as detected by the measuring head 101 of the device of the present invention), the curing characteristics of the film can be determined as a function of the amount of radiation.

Although the device of the invention has been particularly described for use in connection with an apparatus for monitoring the solidification characteristics of a solidifiable liquid film, it will be readily apparent that the device can be used in any situation where it is desired to monitor the amount of ultraviolet radiation present. Thus, it is particularly suitable for use in combination with a printing press having a source of ultraviolet radiation to cure ultraviolet radiation-curable printing inks. As in the case of the described apparatus, the measuring head of the device will be mounted in the press at a location where it will receive the same amount of ultraviolet radiation as the ink on the printed matter passing through the press. The device can also be in a form which can be held in the hand whereby it can be used to monitor the escape of ultraviolet radiation for, for example, the purposes of health and safety.

We claim:

1. A method of monitoring the amount of ultraviolet radiation present at a desired location which comprises:
   providing at said location a filter having opposed parallel planar surfaces linked by an edge and being of the type which emits fluorescent light when exposed to ultraviolet radiation in an amount dependent on the amount of ultraviolet radiation at said location,
   and monitoring the fluorescent light emitted by the filter at said edge to obtain a measure of the amount of ultraviolet radiation at said location.

2. A method according to claim 1, wherein a selected wavelength only of the emitted fluorescent light is monitored.

3. A method according claim 1 wherein the ultraviolet radiation is produced by a lamp and the intensity of the lamp is adjusted in dependence on the amount of fluorescent light emitted.

4. A method according claim 1 wherein the ultraviolet radiation is produced by a lamp and the location receives the same amount of radiation as ultraviolet radiation-curable printing ink on printed material passing the lamp, and wherein the speed of movement of the printed material past the lamp is adjusted in dependence on the amount of fluorescent light emitted.

5. A device for detecting the amount of ultraviolet radiation present at a desired location comprising:
   (i) a measuring head for positioning at said location,
   (ii) a filter included in said measuring head, said filter having opposed parallel planar surfaces linked by an edge and being of the type which emits fluorescent light when exposed to ultraviolet radiation in an amount dependent on the amount of ultraviolet radiation to which it is exposed, and
   (iii) means for detecting the amount of fluorescent light emitted by the filter at said edge to obtain a measure of the amount of ultraviolet radiation present at said location.

6. A device as claimed in claim 5, wherein the means for detecting the amount of fluorescent light is a photodiode detector unit connected to the filter by means of a fibre optic cable.

7. A device as claimed in claim 5 wherein an interference filter is located between the fluorescent filter and the means for detecting the amount of fluorescent light so that selected wavelengths only of fluorescent light are monitored.

8. A device as claimed in claim 5, wherein the means for detecting the amount of fluorescent light is a photodiode detector unit directly attached to the filter.

9. A device as claimed in claim 5 wherein an interference filter is located between the source of ultraviolet radiation and the fluorescent filter so that the fluorescent filter is subjected to ultraviolet radiation of selected wavelength only.

10. A device as claimed in claim 5 wherein the measuring head includes a thermistor operably connected to the means for detecting the amount of fluorescent light emitted so as to compensate for the temperature dependence of the filter.

* * * * *